(12) United States Patent
Hisano et al.

(10) Patent No.: US 12,487,690 B2
(45) Date of Patent: Dec. 2, 2025

(54) COMMUNICATION METHOD FOR COMMUNICATION BETWEEN PEN AND SENSOR CONTROLLER

(71) Applicant: Wacom Co., Ltd., Saitama (JP)

(72) Inventors: Haruhiko Hisano, Saitama (JP);
Hideyuki Hara, Saitama (JP);
Yoshifumi Konda, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/916,577

(22) Filed: Oct. 15, 2024

(65) Prior Publication Data

US 2025/0036224 A1    Jan. 30, 2025

Related U.S. Application Data

(63) Continuation of application No. 18/447,236, filed on Aug. 9, 2023, now Pat. No. 12,141,380, which is a continuation of application No. 17/735,997, filed on May 3, 2022, now Pat. No. 11,755,130.

(30) Foreign Application Priority Data

May 14, 2021  (JP) ................................. 2021-082840

(51) Int. Cl.
*G06F 3/038*   (2013.01)
*G06F 3/01*    (2006.01)
*G06F 3/0354*  (2013.01)

(52) U.S. Cl.
CPC ............ *G06F 3/0383* (2013.01); *G06F 3/016* (2013.01); *G06F 3/03545* (2013.01); *G06F 2218/08* (2023.01)

(58) Field of Classification Search
CPC .......... G06F 3/01; G06F 3/0354; G06F 3/038
See application file for complete search history.

(56) References Cited

U.S. PATENT DOCUMENTS

| | | | | |
|---|---|---|---|---|
| 8,723,827 | B2 * | 5/2014 | Wright ................... | G06F 1/3262 345/173 |
| 10,444,927 | B2 * | 10/2019 | Westhues ............ | G06F 3/04883 |
| 10,474,286 | B2 * | 11/2019 | Bae ........................ | G06F 3/0412 |
| 10,534,464 | B2 * | 1/2020 | Gur ................... | G06F 3/041661 |
| 10,861,323 | B2 | 12/2020 | Yamamoto et al. | |
| 11,429,206 | B2 * | 8/2022 | Hisano ................ | G06F 3/04162 |
| 2018/0032164 | A1 * | 2/2018 | Fleck .................... | G06F 3/0346 |
| 2018/0113559 | A1 * | 4/2018 | Bae ..................... | G06F 3/03545 |

(Continued)

FOREIGN PATENT DOCUMENTS

| | | | |
|---|---|---|---|
| JP | 6603435 | B2 | 10/2019 |
| JP | 6644200 | B2 | 1/2020 |

*Primary Examiner* — Chun-Nan Lin
(74) *Attorney, Agent, or Firm* — Seed Intellectual Property Law Group LLP

(57) ABSTRACT

Provided is a communication method for communication performed between a pen and a sensor controller that, in operation, transmits uplink signals to the pen in a frame cycle. The communication method includes transmitting, by the sensor controller, a first uplink signal in a first frame, the first uplink signal including an identifier that identifies a type of data to be transmitted to the pen in a second frame following the first frame, and transmitting, by the sensor controller, a second uplink signal in the second frame, the second uplink signal including a value of the data of the type indicated by the identifier.

20 Claims, 8 Drawing Sheets

(56) References Cited

U.S. PATENT DOCUMENTS

| | | | |
|---|---|---|---|
| 2018/0129311 A1* | 5/2018 | Westhues | G06F 3/04166 |
| 2019/0102014 A1* | 4/2019 | Gur | G06F 3/041661 |
| 2019/0346970 A1* | 11/2019 | Yamamoto | G06F 3/03545 |
| 2020/0026369 A1* | 1/2020 | Hisano | G06F 3/0442 |
| 2020/0064939 A1 | 2/2020 | Watanabe | |
| 2020/0174589 A1 | 6/2020 | Hara et al. | |
| 2020/0209991 A1* | 7/2020 | Wong | G06F 3/0346 |
| 2021/0263601 A1* | 8/2021 | Choi | G06F 3/0446 |
| 2022/0013003 A1 | 1/2022 | Yamamoto et al. | |

* cited by examiner

COMMUNICATION METHOD FOR COMMUNICATION BETWEEN PEN AND SENSOR CONTROLLER

BACKGROUND

Technical Field

The present disclosure relates to a communication method, and in particular, to a communication method for bidirectional communication performed between an active pen and a sensor controller.

Description of the Related Art

A position detection system is known that includes a sensor controller and a pen and that is configured to allow bidirectional communication between the sensor controller and the pen. In the following description, a signal transmitted from the sensor controller to the pen will be referred to as an "uplink signal," while a signal transmitted from the pen to the sensor controller will be referred to as a "downlink signal."

The uplink signal is a signal that includes a command indicating an instruction from the sensor controller to the pen. The pen which has received the uplink signal performs an operation corresponding to the command included in the uplink signal. The downlink signal includes a position signal and a data signal. The position signal is a signal causing the sensor controller to detect a position of the pen. The data signal is a signal modulated by data to be transmitted from the pen to the sensor controller. The data transmitted by the data signal includes data, such as a pen-pressure value, that is cyclically transmitted for drawing (hereinafter referred to as "normal data") and data that is transmitted as a response to a command (hereinafter referred to as "response data").

The uplink signal also serves to notify the pen of a reference timing of a transmission and reception schedule of the uplink signal and the downlink signal (that is, a timing at which the downlink signal is to be transmitted and a timing at which the next uplink signal is to be received). The sensor controller cyclically transmits the uplink signal. The pen determines the transmission and reception schedule of the uplink signal and the downlink signal according to a timing at which the uplink signal has been received. According to the determined transmission and reception schedule, the pen transmits the downlink signal and receives the next uplink signal.

Examples of the position detection system are disclosed in Japanese Patent No. 6603435 (hereinafter, Patent Document 1) and Japanese Patent No. 6644200 (hereinafter, Patent Document 2). In these examples, a size of the uplink signal can be changed according to a size of a command to be transmitted. With this configuration, a sensor controller can transmit commands of various sizes to a pen.

Incidentally, the applicant is considering making it possible to set data such as a drawing color (BrushColor) to a pen by using a command that is included in an uplink signal. Specifically, the applicant is considering placing a command including a type and a value of setting data in an uplink signal and setting the data to the pen by using this command.

However, since the size of a command including the type and the value of setting data is large, placing such setting data in an uplink signal increases the size of the uplink signal. Since this decreases the length of time that can be allocated for the transmission of a downlink signal and affects periodicity of the normal data, there has been a need for improvement in this regard.

Therefore, it is desirable to provide a communication method that can set data to the pen by using a command that is included in an uplink signal while maintaining the periodicity of the normal data.

In recent years, the number of bits of the pen-pressure value has increased (e.g., 12 bits), making it difficult to place both the response data and the normal data within a single downlink signal. This results in, in some cases, omission of the normal data when the response data is transmitted. Accordingly, there has been a need for improvement in this regard.

Therefore, it is also desirable to provide a communication method that can transmit the response data from the pen to the sensor controller while maintaining the periodicity of the normal data.

The applicant is also considering providing a more realistic writing experience by disposing an output device, such as a haptic element, a light-emitting element, or an acoustic element, inside the pen and controlling the output device according to the pen-pressure value being detected by the pen. The control of the output device includes vibration control of the haptic element, light-emitting control of the light-emitting element, or sound control of the acoustic element.

However, if the output device is controlled according to the pen-pressure value being detected by the pen, the output device is controlled even when the pen tip is pressed against a surface such as a wall other than a touch surface. In this case, the haptic element vibrates, the light-emitting element emits light, or the acoustic element sounds when it is not necessary. Accordingly, there has been a need for improvement in this regard.

BRIEF SUMMARY

Therefore, it is also desirable to provide a communication method that can control the output device disposed in the pen at an appropriate timing.

In this respect, if the output device of the pen is controlled by the sensor controller, it is possible to control the output device only when the sensor controller is detecting the pen. With this configuration, the output device disposed in the pen can be controlled at an appropriate timing. Moreover, for example, information regarding the pen such as the movement speed of the pen that can be recognized by the sensor controller (hereinafter referred to as "recognition information") may be transmitted to the pen via the uplink signal. This enables more advanced control of the output device. For example, it is possible to vibrate the pen with an amount of vibration corresponding to the movement speed of the pen.

However, since the recognition information has a large data size, it is difficult to transmit the recognition information frequently. In this case, the output device continues to be controlled regardless of a state of the pen during a period between the transmission of the recognition information and the next transmission of the recognition information. To give an example, even after the pen leaves the touch surface, the output device continues to be controlled with an amount of control corresponding to the recognition information transmitted last time until the next recognition information is transmitted by the sensor controller that has recognized the pen leaving the touch surface. If this is the case, it cannot be said that the output device disposed in the pen is properly controlled. Accordingly, there has been a need for improvement in this regard.

Therefore, it is also desirable to provide a communication method that can properly control the output device disposed in the pen according to the recognition information.

According to a first aspect of the present disclosure, a communication method for communication performed between a pen and a sensor controller that, in operation, transmits uplink signals to the pen in a frame cycle includes transmitting, by the sensor controller, a first uplink signal in a first frame, the first uplink signal including an identifier that identifies a type of data to be transmitted to the pen in a second frame following the first frame, and transmitting, by the sensor controller, a second uplink signal in the second frame, the second uplink signal including a value of the data of the type indicated by the identifier.

According to a second aspect of the present disclosure, the communication method according to the first aspect is a communication method further including transmitting, by the pen, a downlink signal including response data as a response to the first uplink signal, the response data indicating that the data of the type indicated by the identifier is settable, in which the downlink signal includes a shortened pen-pressure value made up of a predetermined number of high-order bits of a pen-pressure value.

According to a third aspect of the present disclosure, a communication method for communication performed between a pen including an output device and a sensor controller that, in operation, transmits uplink signals to the pen, includes transmitting, by the sensor controller, a first uplink signal when the sensor controller detects that the pen is in a contacting state, the first uplink signal including control information for controlling the output device, and controlling, by the pen, the output device in response to reception of the first uplink signal.

According to a fourth aspect of the present disclosure, the communication method according to the third aspect is a communication method in which the sensor controller, in operation, transmits the uplink signal to the pen in a frame cycle, the communication method further includes acquiring, by the sensor controller, recognition information indicating a result of recognition of the pen, and transmitting, by the sensor controller, a second uplink signal in a first frame, the second uplink signal including a latest value of the recognition information, and the sensor controller transmits the first uplink signal in each of one or more second frames after the first frame.

According to the first aspect of the present disclosure, since the type of data and the value of the data are transmitted in separate frames, the data can be set to the pen by using a command that is included in the uplink signal while the periodicity of normal data is maintained.

According to the second aspect of the present disclosure, even though it is difficult to place the pen-pressure value in the downlink signal, the shortened pen-pressure value can be placed instead. Therefore, the response data can be transmitted from the pen to the sensor controller while the periodicity of the normal data is maintained.

According to the third aspect of the present disclosure, since the output device is controlled in response to the first uplink signal including the control information, the output device disposed in the pen can be controlled at an appropriate timing.

According to the fourth aspect of the present disclosure, the control of the output device can be enabled or disabled according to the latest recognition information without the need to transmit the recognition information every frame. Therefore, the output device disposed in the pen can be properly controlled according to the recognition information.

DETAILED DESCRIPTION

A preferred embodiment of the present disclosure will be described in detail below with reference to the accompanying drawings.

Figure 1:
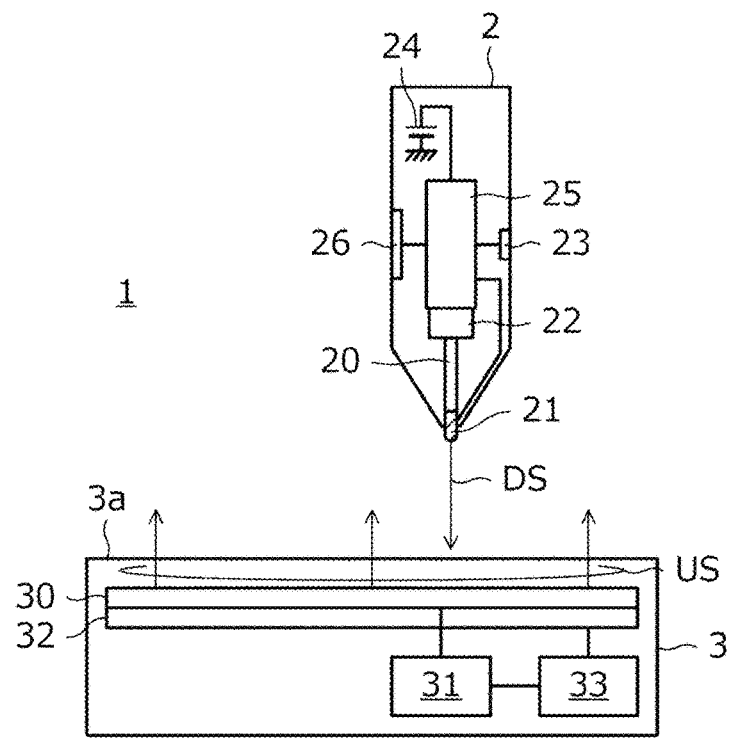
FIG. 1 is a diagram illustrating a configuration of a position detection system according to a first embodiment of the present disclosure.

FIG. 1 is a diagram illustrating a configuration of a position detection system 1 according to an embodiment of the present disclosure. As illustrated in FIG. 1, the position detection system 1 includes an active pen 2 and an electronic device 3 which is a position detection device that detects the active pen 2.

The electronic device 3 is a computer, such as a tablet computer or a digitizer, that includes a touch surface 3a. The electronic device 3 includes a sensor 30, a sensor controller 31, a display 32, and a host processor 33. The sensor 30 is disposed directly under the touch surface 3a. The sensor controller 31 is connected to the sensor 30. The display 32 is superimposed on the sensor 30. The host processor 33 controls components of the electronic device 3 including these units.

The host processor 33 is a central processing unit of the electronic device 3 and executes various programs read from a memory, not illustrated. The programs executed in this way include various applications including an operating system of the electronic device 3 and a drawing application. The drawing application is a program for performing a process of generating digital ink based on the position and data supplied from the sensor controller 31 and storing the digital ink in the memory of the electronic device 3 and a process of rendering the generated digital ink, generating a video signal representing the result of the rendering, and supplying the video signal to the display 32. The display 32 is a device that displays the video signal supplied from the host processor 33 and includes, for example, a liquid-crystal display or an organic electroluminescence (EL) display.

The sensor controller 31 is an integrated circuit that has functions to derive the position of the active pen 2 within the touch surface 3a by bidirectionally communicating with the active pen 2 via the sensor 30, acquire data from the active pen 2, and supply the derived position and the acquired data to the host processor 33 each time. The sensor controller 31 is capable of not only deriving the position of each of a plurality of active pens 2 but also acquiring data from each active pen 2 by bidirectionally communicating with each active pen 2 via the sensor 30.

The sensor controller 31 and the active pen 2 communicate with each other using, for example, an active capacitive method or an electromagnetic induction method. The sensor 30 employing the active capacitive method includes a plurality of x-side linear electrodes and a plurality of y-side linear electrodes. The plurality of x-side linear electrodes each extend in a y direction and are disposed at equal intervals in an x direction. The plurality of y-side linear electrodes each extend in the x direction and are disposed at equal intervals in the y direction. The sensor 30 employing the electromagnetic induction method includes a plurality of x-side loop coils, each of which extends in the y direction, and a plurality of y-side loop coils, each of which extends in the x direction. In the following description, a signal transmitted from the sensor controller 31 to the active pen 2 will be referred to as an uplink signal US, while a signal transmitted from the active pen 2 to the sensor controller 31 will be referred to as a downlink signal DS.

The sensor controller 31 transmits the uplink signal US in a predetermined frame cycle and receives the downlink signal DS in the interval of the uplink signal US. The uplink signal US serves to notify the active pen 2 of a reference timing of a transmission and reception schedule of the uplink signal US and the downlink signal DS (that is, a timing at which the downlink signal DS is to be transmitted and a timing at which the next uplink signal US is to be received). The active pen 2 determines the transmission and reception schedule of the uplink signal US and the downlink signal DS according to the timing at which the uplink signal US has been received. According to the determined transmission and reception schedule, the active pen 2 transmits the downlink signal DS and receives the next uplink signal US. The transmission timing and transmission duration of the downlink signal DS within the interval of the uplink signal US are designated in advance by a communication protocol.

If the sensor controller 31 and the active pen 2 communicate with each other using the active capacitive method, the electronic device 3 may be configured as a generally-called "in-cell" type position detection device. In this case, either the plurality of x-side linear electrodes or the plurality of y-side linear electrodes that constitute the sensor 30 serve as common electrodes of the display 32 (electrodes for commonly supplying a ground potential to each pixel). Therefore, since the sensor controller 31 cannot use the sensor 30 to transmit the uplink signal US or receive the downlink signal DS at the timing at which pixels in the display 32 are driven, the sensor controller 31 acquires the timing at which the pixels in the display 32 are driven from the host processor 33. Then, the sensor controller 31 transmits the uplink signal US in the above-described frame cycle which is a fixed cycle determined according to a pixel driving cycle. At the same time, the sensor controller 31 sets a plurality of time slots each corresponding to a pixel driving interval as a transmission interval of the uplink signal US and receives the downlink signal DS from the active pen 2 by using the time within each time slot.

The configurations of the uplink signal US and the downlink signal DS will be briefly described herein. The uplink signal US is a signal modulated by a command indicating an instruction to the active pen 2 and includes a pulse wave (square wave) that is a result of spreading each transmission bit by a predetermined chip sequence (spreading code). The downlink signal DS includes a position signal and a data signal. The position signal is a signal causing the sensor controller 31 to detect the position of the active pen 2. The data signal is a signal modulated by data to be transmitted to the sensor controller 31. The data transmitted by the data signal includes normal data and response data. The normal data is transmitted cyclically for drawing and includes, for example, a pen-pressure value. The response data is transmitted as a response to a command. Note that the transmission of the position signal is not mandatory and the sensor controller 31 can detect the position of the active pen 2 from the data signal.

The active pen 2 includes a core body 20, a pen tip electrode 21, a pressure sensor 22, a side switch 23, a battery 24, an integrated circuit 25, and an output device 26. The core body 20 is a member constituting a pen axis of the active pen 2. The core body 20 has a distal end constituting a pen tip of the active pen 2 and a proximal end abutting against the pressure sensor 22. The pen tip electrode 21 is an electric conductor disposed on the pen tip and is electrically connected to the integrated circuit 25.

The pressure sensor 22 is a sensor that detects a pressure applied to the distal end of the core body 20. The pressure detected by the pressure sensor 22 is supplied to the integrated circuit 25 as, for example, a 12-bit pen-pressure value. When no pressure is applied to the distal end of the core body 20, the pen-pressure value supplied from the pressure sensor 22 to the integrated circuit 25 is 0. A state in which the pen-pressure value is 0 will be referred to as a "hovering state" in the following description. When a pressure is applied to the distal end of the core body 20, the pen-pressure value supplied from the pressure sensor 22 to the integrated circuit 25 is greater than 0. A state in which the pen-pressure value is greater than 0 will be referred to as a "contacting state" in the following description.

The side switch 23 is a push-button switch disposed on a surface of the active pen 2 and can be switched on and off by a user. The operation state (on/off state) of the side switch 23 is supplied to the integrated circuit 25 as, for example, 2-bit switch information. Although only one side switch 23 is illustrated in FIG. 1, a plurality of side switches 23 may be disposed.

The integrated circuit 25 is an integrated circuit that operates by power supplied from the battery 24 and performs various processes including reception of the uplink signal US and generation and transmission of the downlink signal DS. Specifically, the integrated circuit 25 receives the uplink signal US by detecting a change in the electric potential of the pen tip electrode 21, generates the downlink signal DS based on the received uplink signal US, and transmits the downlink signal DS by changing the electric potential of the pen tip electrode 21 based on the generated downlink signal DS. Other processes performed by the integrated circuit 25 based on the uplink signal US include a process of determining the above-described transmission and reception schedule based on a reference time which is the timing at which the uplink signal US has been received.

The integrated circuit 25 is capable of setting various kinds of data from the sensor controller 31. This data includes, for example, an attribute BrushColor. The attribute BrushColor is used to determine a drawing color of digital ink when the drawing application renders the digital ink. The attribute BrushColor is transmitted from the active pen 2 to the sensor controller 31 in response to a request (specifically, a command GetVersion or a command GetData to be described later) from the sensor controller 31 during pairing to be described later.

The output device 26 is a device for giving sensory feedback to the user of the active pen 2 and includes, for example, a haptic element such as an actuator, a light-emitting element such as a light-emitting diode, or an acoustic element such as a speaker. The integrated circuit 25 performs a process of giving sensory feedback to the user by controlling the output device 26 according to recognition information and control information received from the sensor controller 31. This point will be described in detail later with reference to FIGS. 8 and 9.

Figure 2:
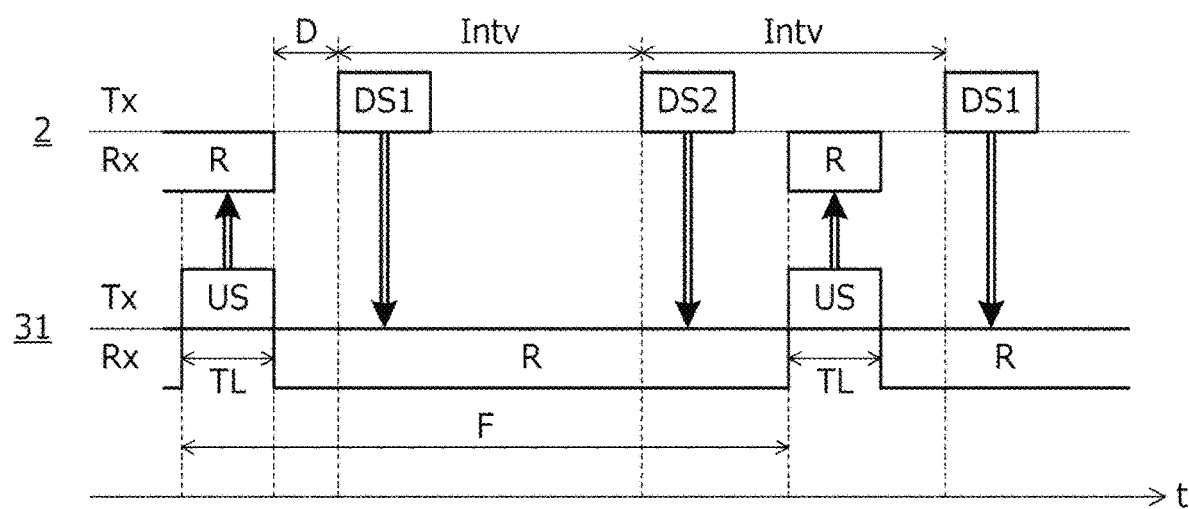
FIG. 2 is a diagram for describing a transmission and reception schedule of an uplink signal and a downlink signal according to the present disclosure.

FIG. 2 is a diagram for describing the transmission and reception schedule of the uplink signal US and the downlink signal DS. As illustrated in FIG. 2, the sensor controller 31 first transmits the uplink signal US in the fixed frame cycle F. A time length TL of each uplink signal US is a fixed value. In the transmission interval of the uplink signal US, the sensor controller 31 performs an operation of receiving the downlink signal DS (denoted as "R" in FIG. 2).

The active pen 2 repeats the operation of receiving the uplink signal US continuously or intermittently until the uplink signal US starts to be received. When the active pen 2 receives the uplink signal US as a result of this operation, the active pen 2 starts communicating with the sensor controller 31 by establishing pairing with the sensor controller 31. Through the pairing which will be described in detail later, the active pen 2 is assigned a local identifier which is used by the sensor controller 31 to identify each active pen 2 in communication.

The active pen 2 which has established pairing with the sensor controller 31 transmits the downlink signal DS during the transmission interval of the uplink signal US. A specific timing at which the downlink signal DS is transmitted is predetermined for each local identifier in the communication protocol. An example of the transmission timing predetermined in the communication protocol is illustrated in FIG. 2. Specifically, a first downlink signal DS (hereinafter occasionally referred to as a "downlink signal DS1") starts to be transmitted after a time D has elapsed from the start of the transmission interval of the uplink signal US. After a time Intv has elapsed since the start of the transmission of the downlink signal DS1, a second downlink signal DS (hereinafter occasionally referred to as a "downlink signal DS2") starts to be transmitted. In this example, as illustrated in FIG. 2, it is preferable that specific values of the time D and the time Intv be determined such that the length of time elapsed from the start of the transmission of the downlink signal DS2 to the start of the transmission of the downlink signal DS1 transmitted thereafter is equal to the time Intv. In this way, the sensor controller 31 can detect the position of the active pen 2 and receive data transmitted from the active pen 2 in a fixed cycle.

Figure 3:
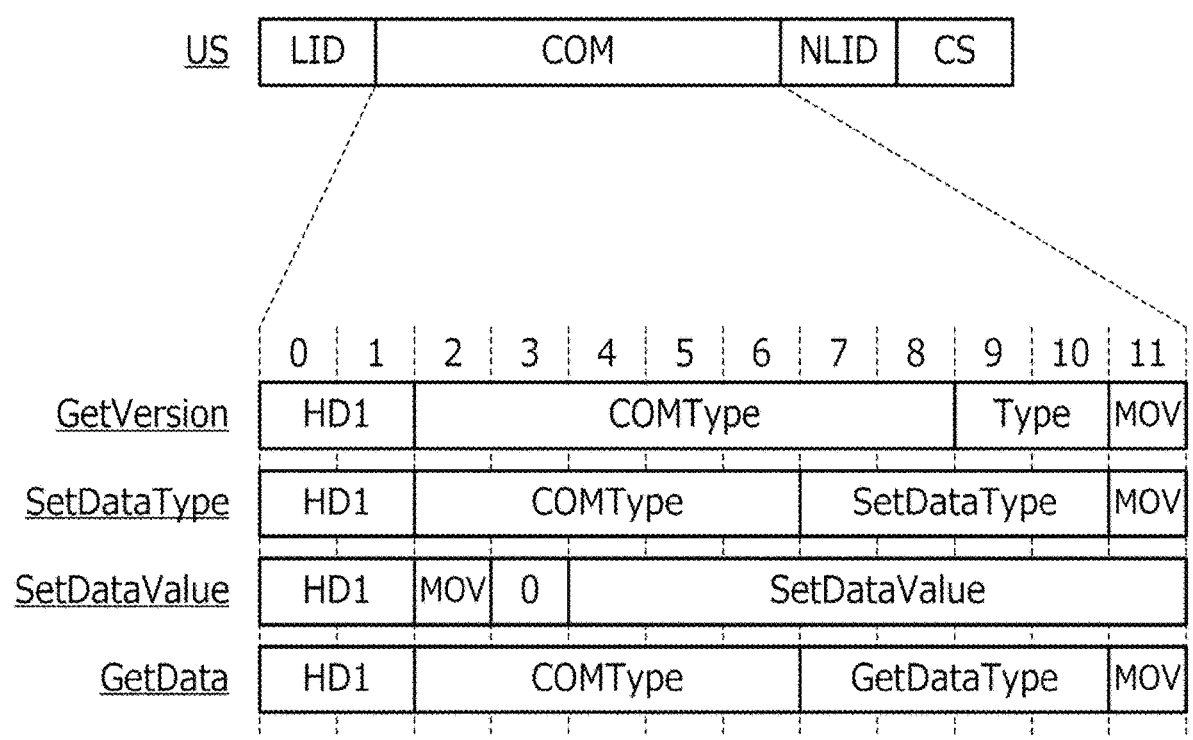
FIG. 3 is a diagram illustrating a configuration of an uplink signal according to the present disclosure.

FIG. 3 is a diagram illustrating a configuration of the uplink signal US. Referring to an upper portion of the diagram, the uplink signal US includes a local identifier LID, a command COM, a local identifier NLID, and an error detection code CS in this order. The local identifiers LID and NLID are the local identifier described above. The command COM is data indicating an instruction from the sensor controller 31 to the active pen 2. The local identifier LID included in the uplink signal US indicates the destination of the command COM, and only the active pen 2 that stores the local identifier LID performs processing corresponding to the command COM (e.g., generation of the downlink signal DS corresponding to the command COM). The error detection code CS is a code used by the active pen 2 that has received the uplink signal US to detect a bit error that has occurred in a communication path.

The pairing between the sensor controller 31 and the active pen 2 will be described in detail herein. First, the sensor controller 31 which is not being paired with any active pen 2 sets the local identifier to be assigned to a first paired active pen 2 to the local identifier NLID in the uplink signal US. The active pen 2 which has received this uplink signal US extracts the local identifier NLID included in the uplink signal US and stores the local identifier NLID as its own local identifier LID, thereby establishing pairing with the sensor controller 31. After that, the active pen 2 transmits the downlink signal DS at a timing assigned to the stored local identifier.

The sensor controller 31 determines whether or not the downlink signal DS has been received at the timing assigned to the local identifier set in the local identifier NLID. In response to the reception of the downlink signal DS, the sensor controller 31 stores the local identifier NLID as the paired local identifier, thereby establishing paring with the active pen 2. After that, the sensor controller 31 starts bidirectionally communicating with the active pen 2 with which pairing has been established, and also sets a new local identifier in the local identifier NLID included in the uplink signal US. When there is a new active pen 2 that stores this local identifier NLID, pairing is performed again following the same procedure described above. In addition, while pairing is being established, the sensor controller 31 performs a process of transmitting the command GetVersion or the command GetData to be described later to the active pen 2 to acquire various pieces of information such as the version and the above-described attribute BrushColor from the active pen 2 and also performs a process of reporting these pieces of information to the host processor 33.

FIG. 3 illustrates four types of commands COM, that is, GetVersion, SetDataType, SetData Value, and GetData. Although only the four types of commands COM are illustrated in FIG. 3, there are many more types of commands COM available in actual implementations. In the following description, the uplink signal US may be occasionally referred to by the name of the command COM. For example, the uplink signal US including the command Get Version may be simply referred to as the "command GetVersion."

As illustrated in FIG. 3, each command COM includes a header HD1, a data COMType, and control information MOV. The header HD1 is 2-bit data indicating that this signal is the command COM. The data COMType is data indicating the type of command COM. The active pen 2 first detects that the received uplink signal US includes the command COM by referring to the header HD1. Next, the active pen 2 acquires the type of command COM by referring to the data COMType. The control information MOV is 1-bit data for controlling the output device 26 of the active pen 2 from the sensor controller 31. The control information MOV will be described in detail later with reference to FIGS. 8 and 9.

The role and configuration of each type of command COM will be described below. The command Get Version is a command for acquiring the version of the active pen 2 (e.g., the version of a firmware loaded in the integrated circuit 25) or a global identifier (ID) pre-assigned to the active pen 2, and includes 2-bit data Type indicating the type of data to be acquired. The command SetData Type is a command for notifying the active pen 2 of the type of data whose value is to be transmitted in a subsequent frame, and includes a 4-bit identifier SetDataType. The command SetData Value is a command for actually transmitting the value of the data that the active pen 2 has been notified through the command SetDataType, and includes the value of the data SetData Value corresponding to the identifier SetDataType. The maximum number of bits of the data value SetData Value is 8. The command GetData is a command for acquiring any data from the active pen 2 and includes 4-bit data GetDataType indicating the type of data to be acquired.

Figure 4:
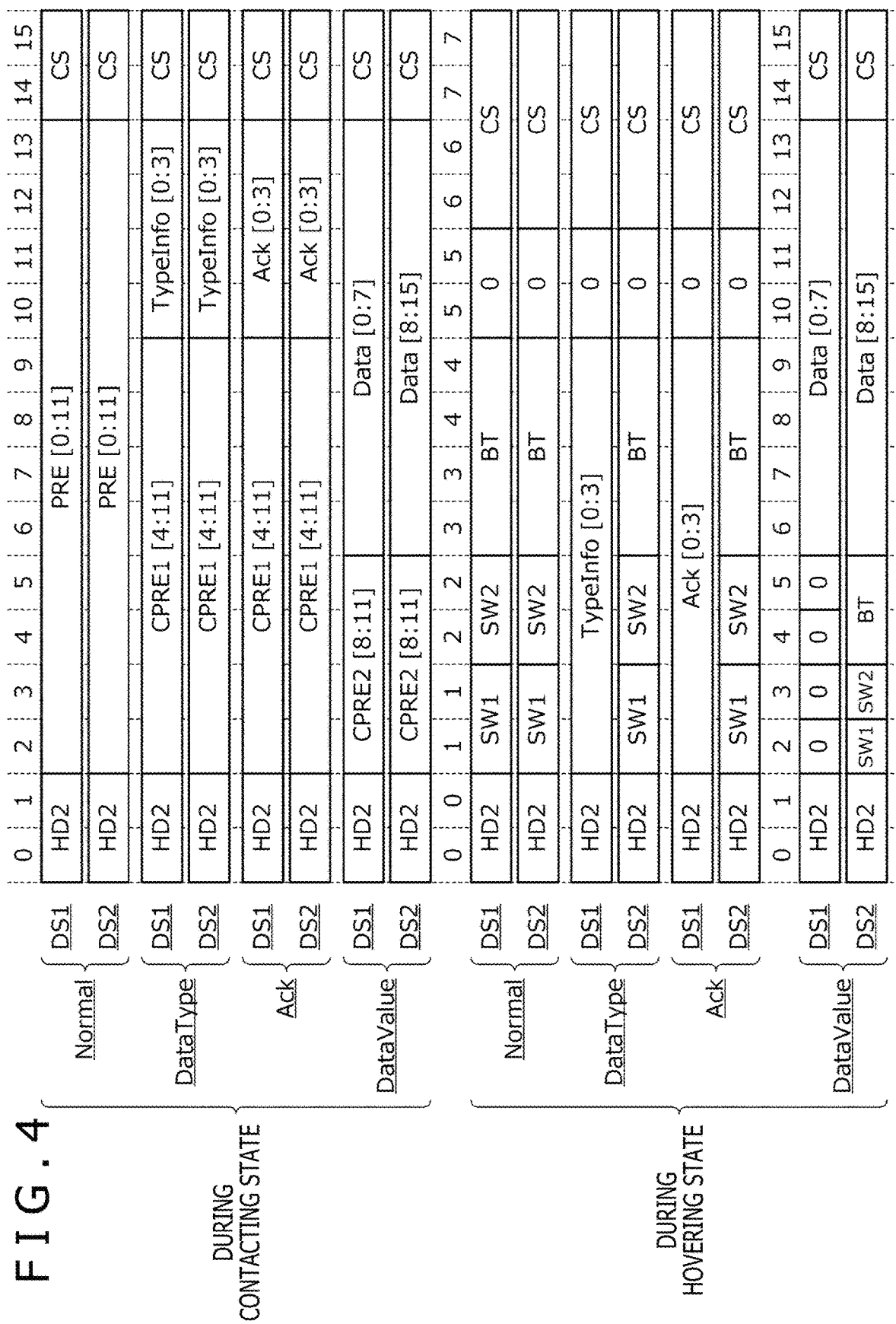
FIG. 4 is a diagram illustrating a configuration of a data signal portion included in each of downlink signals illustrated in FIG. 2 when a bit length of a data signal is 16 bits.
Figure 5:
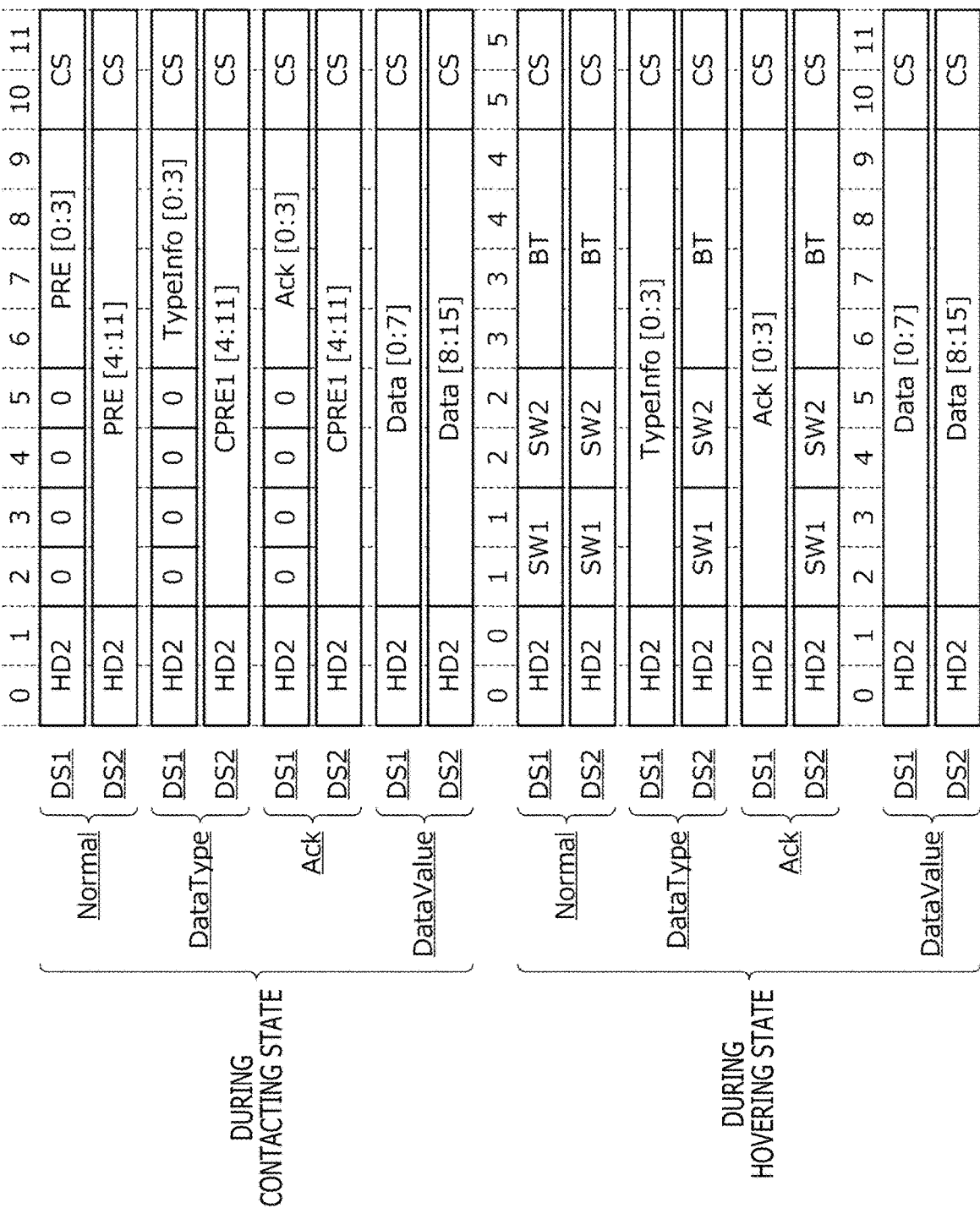
FIG. 5 is a diagram illustrating a configuration of a data signal portion included in each of the downlink signals illustrated in FIG. 2 when the bit length of a data signal is 12 bits.

FIGS. 4 and 5 are diagrams each illustrating a configuration of the above-described data signal portion included in each of the downlink signals DS1 and DS2 illustrated in FIG. 2. FIG. 4 illustrates a case where the bit length of a data signal is 16 bits, while FIG. 5 illustrates a case where the bit length of a data signal is 12 bits.

As illustrated in FIGS. 4 and 5, the configurations of the downlink signals DS1 and DS2 are different between the contacting state and the hovering state. However, in either case, the downlink signals DS1 and DS2 include any one of four types of data signals, Normal, DataType, Ack, and DataValue. The data signal Normal is a signal including the normal data and is transmitted when there is no need to transmit any other types of data signals. The data signals DataType, Ack, and DataValue are signals each including the response data that is transmitted as a response to the command COM included in the uplink signal US that has been received. The data signals DataType, Ack, and Data Value also include the normal data with some exceptions to be described later.

As illustrated in FIGS. 4 and 5, each type of data signal includes a 2-bit header HD2 and a 2-bit or 4-bit error detection code CS. The error detection code CS is a code used by the sensor controller 31 that has received the data signal to detect a bit error that has occurred in the communication path.

The header HD2 is data that takes one of the values "00," "01," or "10" if the active pen 2 is in the contacting state, whereas the header HD2 takes the value of "11" if the active pen 2 is in the hovering state. The sensor controller 31 first refers to this header HD2 to acquire the state of contact of the active pen 2 (specifically, the active pen 2 is either in the contacting state or the hovering state).

The header HD2 during the contacting state also indicates the state of pressing of the side switch 23 illustrated in FIG. 1 or the state in which the active pen 2 is unpaired. For example, assume a case where the active pen 2 includes two side switches 23. In this case, "00" may be assigned to a state in which neither of the two side switches 23 is being pressed, "01" may be assigned to a state in which the first side switch 23 is being pressed, and "10" may be assigned to a state in which the second side switch 23 is being pressed, for example. In another example, "00" of the downlink signals DS1 and DS2 may be assigned to a state in which neither of the two side switches 23 is being pressed, "01" of the downlink signal DS1 may be assigned to a state in which the first side switch 23 is being pressed, "01" of the downlink signal DS2 may be assigned to a state in which the second side switch 23 is being pressed, and "10" of the downlink signals DS1 and DS2 may be assigned to a state in which the active pen 2 is unpaired. In this way, the sensor controller 31 which has detected that the active pen 2 is in the contacting state by referring to the header HD2 acquires any of the states described above by further referring to the header HD2.

The configuration of each type of data signal will be described in detail below. First, a case where the data signal is 16 bits and the active pen 2 is in the contacting state will be described with reference to FIG. 4. The data signal Normal in both of the downlink signals DS1 and DS2 in this case includes the entire 12-bit pen-pressure value PRE supplied from the pressure sensor 22 to the integrated circuit 25 as illustrated in FIG. 4. Accordingly, the sensor controller 31 can acquire the pen-pressure value PRE from the active pen 2 in the cycle of the time Intv illustrated in FIG. 2.

The data signal DataType is a signal transmitted as a response to the command SetData Type illustrated in FIG. 3. The data signal DataType in both of the downlink signals DS1 and DS2 includes a shortened pen-pressure value CPRE1 and data TypeInfo. The shortened pen-pressure value CPRE1 is made up of high-order 8 bits of the pen-pressure value PRE. The data TypeInfo is data equal to the identifier SetDataType included in the command SetDataType. The sensor controller 31 which has received the data signal DataType restores the 12-bit pen-pressure value PRE by adding four "0s" to the shortened pen-pressure value CPRE1 as padding. Further, the sensor controller 31 compares the 10th to 13th bits of either of the two data signals received in the frame in which the command SetDataType has been transmitted with the identifier SetDataType that has been transmitted. If they match, the sensor controller 31 determines that the active pen 2 has correctly received the command SetDataType.

Here, even though the active pen 2 has not correctly received the command SetDataType and has transmitted the data signal Normal, there is a possibility that the 10th to 13th bits of either of the two data signals transmitted in the same frame as the command SetDataType coincidentally match the identifier SetDataType. However, since this situation rarely happens, the position detection system 1 tolerates this match as one of the errors. This similarly applies to the other types of data signals to be described later.

The data signal Ack is a signal transmitted as a response to the command SetData Value illustrated in FIG. 3. The data signal Ack in both of the downlink signals DS1 and DS2 includes the shortened pen-pressure value CPRE1 and a response Ack. The response Ack is the hash value of the data value SetData Value included in the command SetData Value. As with the data signal DataType, the sensor controller 31 which has received the data signal Ack restores the pen-pressure value PRE from the shortened pen-pressure value CPRE1.

A hash function for deriving the above-described hash value is shared in advance between the active pen 2 and the sensor controller 31. The active pen 2 uses this hash function to derive the hash value of the received data value SetData Value, thereby generating the response Ack. The sensor controller 31 also uses this hash function to derive the hash value of the data value SetData Value. The sensor controller 31 which has transmitted the command SetData Value compares the hash value of the data value SetData Value derived by itself with the 10th to 13th bits of either of the two data signals received in the frame in which the command SetData Value has been transmitted. If they match, the sensor controller 31 determines that the active pen 2 has correctly received the command SetData Value.

The data signal Data Value is a signal transmitted as a response to the command GetData illustrated in FIG. 3. The data signal DataValue in both of the downlink signals DS1 and DS2 includes a shortened pen-pressure value CPRE2 and at least part of data Data. The shortened pen-pressure value CPRE2 is made up of high-order 4 bits of the pen-pressure value PRE. The Data is data requested to be transmitted by the command Get Version or the command GetData. The sensor controller 31 which has received the data signal DataValue restores the 12-bit pen-pressure value PRE by adding eight "0s" to the shortened pen-pressure value CPRE2 as padding.

The maximum number of bits of data Data that can be transmitted in one frame is 16 bits. Low-order 8 bits are placed in the data signal Data Value to be transmitted by the downlink signal DS1, while high-order 8 bits are placed in the data signal Data Value to be transmitted by the downlink signal DS2. The sensor controller 31 acquires the data Data transmitted from the active pen 2 by extracting the 6th to 13th bits from each of the two data signals received in the frame in which the command Get Version or the command GetData has been transmitted.

Continuously referring to FIG. 4, a case in which the data signal is 16 bits and the active pen 2 is in the hovering state will be described. The data signal transmitted during the hovering state is different from the data signal transmitted during the contacting state in that the data signal transmitted during the hovering state does not at least directly include the pen-pressure value or the shortened pen-pressure value. However, setting the header HD2 to "11" indirectly notifies the sensor controller 31 of the state in which the pen-pressure value is 0.

Further, each of the data signals Normal, DataType, and Ack that are transmitted during the hovering state is configured such that an even-numbered bit and an odd-numbered bit have the same value. This configuration allows the sensor controller 31 to normally receive the data signal even during the hovering state in which the distance between the sensor 30 and the pen tip electrode 21 is greater than the distance therebetween during the contacting state. With this configuration, the number of bits that can be substantially transmitted by each of the data signals Normal, DataType, and Ack is halved to 8 bits. The error detection code CS included in each of the data signals Normal, DataType, and Ack during the hovering state is 4-bit data, which is substantially a 2-bit error detection code CS. Meanwhile, the data signal DataValue that is transmitted during the hovering state is substantially a 16-bit signal, as with the data signal DataValue that is transmitted during the contacting state.

The data signal Normal in both of the downlink signals DS1 and DS2 that are transmitted during the hovering state includes substantially 1-bit data SW1, substantially 1-bit data SW2, and substantially 2-bit data BT. The pieces of data SW1 and SW2 indicate on/off of the first and second side switches 23, respectively. The data BT is data indicating the remaining capacity of the battery 24. The sensor controller 31 acquires the pieces of data SW1, SW2, and BT by demodulating the received data signal Normal. This similarly applies to the other data signals DataType, Ack, and Data Value to be described later.

The data signal DataType in the downlink signal DS2 that is transmitted during the hovering state has the same configuration as the data signal Normal that is transmitted during the hovering state. Meanwhile, the data signal DataType in the downlink signal DS1 that is transmitted during the hovering state includes substantially 4-bit data TypeInfo, instead of the pieces of data SW1, SW2, and BT. As described above, the data TypeInfo is data equal to the identifier SetData Type included in the command SetData-Type. The sensor controller 31 compares the 1st to 4th bits of the data signal in the downlink signal DS1 received in the frame in which the command SetDataType has been transmitted with the identifier SetData Type that has been transmitted. If they match, the sensor controller 31 determines that the active pen 2 has correctly received the command SetDataType.

The data signal Ack in the downlink signal DS2 that is transmitted during the hovering state has the same configuration as the data signal Normal that is transmitted during the hovering state. Meanwhile, the data signal Ack in the downlink signal DS1 that is transmitted during the hovering state includes a substantially 4-bit response Ack, instead of the pieces of data SW1, SW2, and BT. As described above, the response Ack is the hash value of the data value SetData Value included in the command SetData Value. The sensor controller 31 compares the hash value of the data value SetData Value derived by itself with the 1st to 4th bits of the data signal in the downlink signal DS1 received in the frame in which the command SetData Value has been transmitted. If they match, the sensor controller 31 determines that the active pen 2 has correctly received the command SetData Value.

The data signal Data Value in both of the downlink signals DS1 and DS2 that are transmitted during the hovering state includes at least part of the data Data requested to be transmitted by the command Get Version or the command GetData. The maximum number of bits of data Data that can be transmitted in one frame is 16 bits, as with the data signal Data Value that is transmitted during the contacting state. Low-order 8 bits are placed in the data signal Data Value to be transmitted by the downlink signal DS1, while high-order 8 bits are placed in the data signal Data Value to be transmitted by the downlink signal DS2. The sensor controller 31 acquires the data Data transmitted from the active pen 2 by extracting the 6th to 13th bits from each of the two data signals received in the frame in which the command Get Version or the command GetData has been transmitted. Further, the data signal Data Value in the downlink signal DS2 further includes the pieces of data SW1, SW2, and BT.

FIG. 5 illustrates a case where the data signal is 12 bits. The following description focuses on the difference between the case where the data signal is 12 bits and the case where the data signal is 16 bits illustrated in FIG. 4. The data signal Normal in both of the downlink signals DS1 and DS2 that are transmitted during the contacting state includes part of the pen-pressure value PRE. Specifically, low-order 4 bits of the pen-pressure value PRE are placed in the data signal Normal to be transmitted by the downlink signal DS1, while high-order 8 bits of the pen-pressure value PRE are placed in the data signal Normal to be transmitted by the downlink signal DS2. The sensor controller 31 acquires the entire 12-bit pen-pressure value PRE by combining them. Therefore, when the data signal is 12 bits, the cycle for the sensor controller 31 to acquire the pen-pressure value PRE from the active pen 2 is the same as the frame cycle F illustrated in FIG. 2 except for the case where the data signal Data Value to be described later is transmitted.

The data signal DataType in the downlink signal DS1 that is transmitted during the contacting state includes the above-described data TypeInfo. The sensor controller 31 compares the 6th to 9th bits of the data signal in the downlink signal DS1 received in the frame in which the command SetData-Type has been transmitted with the identifier SetDataType that has been transmitted. If they match, the sensor controller 31 determines that the active pen 2 has correctly received the command SetDataType.

The data signal DataType in the downlink signal DS2 that is transmitted during the contacting state includes the above-described shortened pen-pressure value CPRE1. As in the case where the data signal is 16 bits, the sensor controller 31 restores the pen-pressure value PRE from the shortened pen-pressure value CPRE1. Alternatively, low-order 4 bits of the pen-pressure value PRE may be placed in the data signal DataType to be transmitted by the downlink signal DS1, so that when the data signal DataType is transmitted, the entire pen-pressure value PRE can be transmitted in one frame.

The data signal Ack in the downlink signal DS1 that is transmitted during the contacting state includes the above-described response Ack. The sensor controller 31 compares the hash value of the data value SetData Value derived by itself with the 6th to 9th bits of the data signal in the downlink signal DS1 received in the frame in which the command SetData Value has been transmitted. If they match, the sensor controller 31 determines that the active pen 2 has correctly received the command SetData Value.

The data signal Ack in the downlink signal DS2 that is transmitted during the contacting state includes the above-described shortened pen-pressure value CPRE1. As with the data signal DataType, the sensor controller 31 restores the pen-pressure value PRE from this shortened pen-pressure value CPRE1 or the entire pen-pressure value PRE may be transmitted in one frame by placing low-order 4 bits of the pen-pressure value PRE in the data signal Ack to be transmitted by the downlink signal DS1.

The data signal Data Value in both of the downlink signals DS1 and DS2 that are transmitted during the contacting state includes at least part of the above-described data Data. Specifically, low-order 8 bits of the data Data are placed in the data signal Data Value to be transmitted by the downlink signal DS1, while high-order 8 bits of the data Data are placed in the data signal Data Value to be transmitted by the downlink signal DS2. The sensor controller 31 acquires the data Data transmitted from the active pen 2 by extracting the 2nd to 9th bits from each of the two data signals received in the frame in which the command Get Version or the command GetData has been transmitted. In this case, the sensor controller 31 is not able to acquire the pen-pressure value or the shortened pen-pressure value even once in one frame cycle F.

As with the case where the data signals are 16 bits, the data signals Normal, DataType, and Ack that are transmitted during the hovering state are configured such that an even-numbered bit and an odd-numbered bit have the same value. The error detection code CS in each of the data signals Normal, DataType, and Ack that are transmitted during the hovering state is substantially 1-bit data.

The data signal Normal in both of the downlink signals DS1 and DS2 that are transmitted during the hovering state includes the above-described pieces of data SW1, SW2, and BT.

The data signal DataType in the downlink signal DS2 that is transmitted during the hovering state has the same configuration as the data signal Normal that is transmitted during the hovering state. Meanwhile, the data signal DataType in the downlink signal DS1 that is transmitted during the hovering state includes the substantially 4-bit data TypeInfo instead of the pieces of data SW1, SW2, and BT. The specific content of the data TypeInfo is the same as that of the data TypeInfo that is transmitted during the contacting state. The sensor controller 31 compares the 1st to 4th bits of the data signal in the downlink signal DS1 received in the frame in which the command SetDataType has been transmitted with the identifier SetDataType that has been transmitted. If they match, the sensor controller 31 determines that the active pen 2 has correctly received the command SetDataType.

The data signal Ack in the downlink signal DS2 that is transmitted during the hovering state also has the same configuration as the data signal Normal that is transmitted during the hovering state. Meanwhile, the data signal Ack in the downlink signal DS1 that is transmitted during the hovering state includes the substantially 4-bit response Ack instead of the pieces of data SW1, SW2, and BT. The specific content of the response Ack is the same as that of the response Ack that is transmitted during the contacting state. The sensor controller 31 compares the hash value of the data value SetData Value derived by itself with the 1st to 4th bits of the data signal in the downlink signal DS1 received in the frame in which the command SetData Value has been transmitted. If they match, the sensor controller 31 determines that the active pen 2 has correctly received the command SetData Value.

The data signal Data Value during the hovering state has the same configuration as the data signal Data Value during the contacting state. Therefore, the sensor controller 31 acquires the data Data transmitted from the active pen 2, by extracting the 2nd to 9th bits from each of the two data signals received in the frame in which the command GetVersion or the command GetData has been transmitted. During the hovering state as well, the active pen 2 does not transmit the pieces of data SW1, SW2, and BT even once in the frame in which the active pen 2 transmits the data signal Data Value.

Next, the processing performed by the sensor controller 31 and the active pen 2 will be described in detail with reference to FIGS. 6 to 8. In the following description, the downlink signal DS may be occasionally referred to by the name of the data signal. For example, the downlink signal DS including the data signal Normal may be simply referred to as "data signal Normal."

Figure 6:
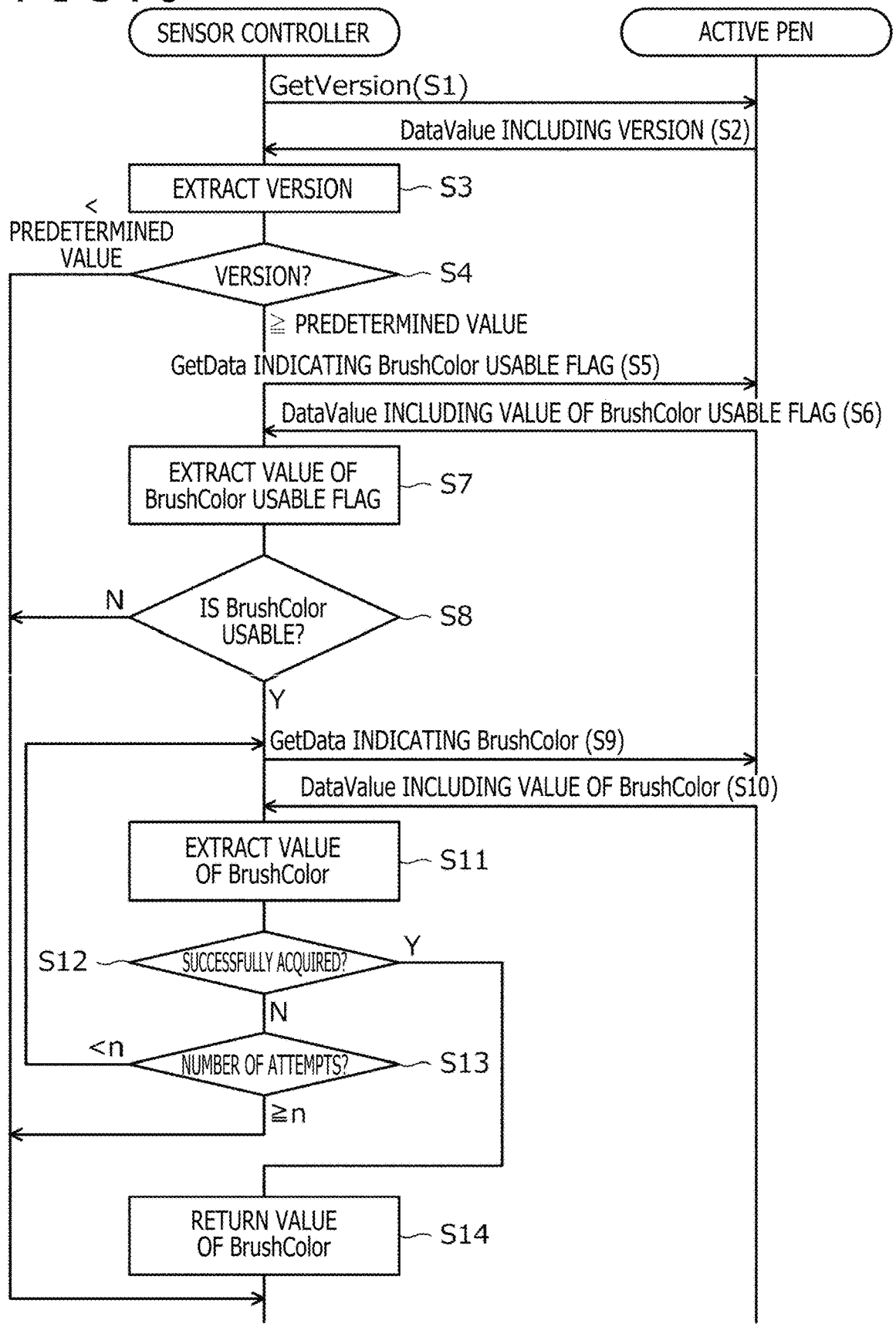
FIG. 6 is a sequence diagram illustrating processing performed when a sensor controller acquires data from an active pen according to the present disclosure.

FIG. 6 is a sequence diagram illustrating the processing performed when the sensor controller 31 acquires data from the active pen 2. Although the example described herein assumes a case where the sensor controller 31 acquires the value of the attribute BrushColor set in the active pen 2, the processing to be described below similarly applies to a case where the sensor controller 31 acquires other data.

First, the sensor controller 31 transmits the command Get Version (third uplink signal) to the active pen 2 (S1). In response, the active pen 2 generates and transmits the data signal DataValue including the data Data indicating the version of the active pen 2 (S2). The sensor controller 31 which has received this data signal Data Value extracts the version of the active pen 2 from the received data signal Data Value (S3). When extracting the version, the sensor controller 31 determines whether the active pen 2 is in the contacting state or in the hovering state by referring to the header HD2, and then extracts the data transmitted from the active pen 2 according to the format determined based on the state of the active pen 2. This point similarly applies to a case where data is extracted from the other data signals to be described later.

Although not illustrated, at S3, the sensor controller 31 also extracts normal data such as the pen-pressure value PRE, the shortened pen-pressure value CPRE1 or CPRE2, or the pieces of data SW1, SW2, and BT. When the sensor controller 31 extracts the shortened pen-pressure value CPRE1 or CPRE2, the sensor controller 31 also performs a process of restoring the pen-pressure value PRE by adding one or more 0. Each time the sensor controller 31 extracts or restores data, the sensor controller 31 reports the extracted or restored data to the host processor 33. This point similarly applies to a case where data is extracted from the other data signals to be described later.

Next, the sensor controller 31 determines whether or not the extracted version is equal to or greater than a predetermined value (S4). The predetermined value herein is determined according to the type of data to be acquired. In this example, the predetermined value indicates the version that incorporates a BrushColor usable flag indicating whether or not the active pen 2 supports the attribute BrushColor.

As a result of the determination at S4, when the sensor controller 31 determines that the extracted version is not equal to or greater than the predetermined value, the sensor controller 31 ends the processing without acquiring data. On the other hand, when the sensor controller 31 determines that the extracted version is equal to or greater than the predetermined value, the sensor controller 31 transmits the command GetData including the data GetDataType indicating the BrushColor usable flag in the subsequent frame (S5). The active pen 2 which has received this command GetData generates and transmits the data signal DataValue including the data Data indicating the value of the BrushColor usable flag stored in the active pen 2 (S6).

The sensor controller 31 which has received the data signal Data Value transmitted at S6 extracts the value of the BrushColor usable flag from the received data signal Data Value (S7). Then, the sensor controller 31 determines whether or not the active pen 2 supports the attribute BrushColor based on the extracted value (S8). As a result of the determination, when the sensor controller 31 determines that the active pen 2 does not support the attribute BrushColor, the sensor controller 31 ends the processing without acquiring data. On the other hand, when the sensor controller 31 determines that the active pen 2 supports the attribute BrushColor, the sensor controller 31 transmits the command GetData including the data GetDataType indicating the attribute BrushColor in the subsequent frame (S9).

The sensor controller 31 may perform the processes of S1 to S8 in advance. In this case, only when it is known that the active pen 2 supports the attribute BrushColor, the sensor controller 31 may start the processing from S9.

The active pen 2 which has received the command GetData transmitted at S9 generates and transmits the data signal Data Value including the data Data indicating the value of the attribute BrushColor stored in the active pen 2 (S10).

The sensor controller 31 which has received the data signal Data Value transmitted at S10 extracts the value of the attribute BrushColor from the received data signal Data Value (S11). Then, the sensor controller 31 determines whether or not the value of the attribute BrushColor has been successfully acquired (S12). The determination result becomes negative when, for example, the active pen 2 fails to receive the command GetData at S9. Further, for example, when the size of the data Data to be transmitted is so large that the active pen 2 needs to transmit the data Data by using two or more frames, the determination result also becomes negative at the timing of the first frame.

When the sensor controller 31 determines at S12 that the value of the attribute BrushColor has been successfully acquired, the sensor controller 31 returns the value of the acquired attribute BrushColor to the main routine (S14) and ends the processing. On the other hand, when the sensor controller 31 determines at S12 that the acquisition of the value of the attribute BrushColor has failed, the sensor controller 31 determines whether or not the number of attempts has reached predetermined n times (S13). When the sensor controller 31 determines that the number of attempts has not reached the predetermined n times, the sensor controller 31 returns to S9 and repeats the processing. When the sensor controller 31 determines that the number of attempts has reached the predetermined n times, the sensor controller 31 ends the processing without acquiring data.

Figure 7:
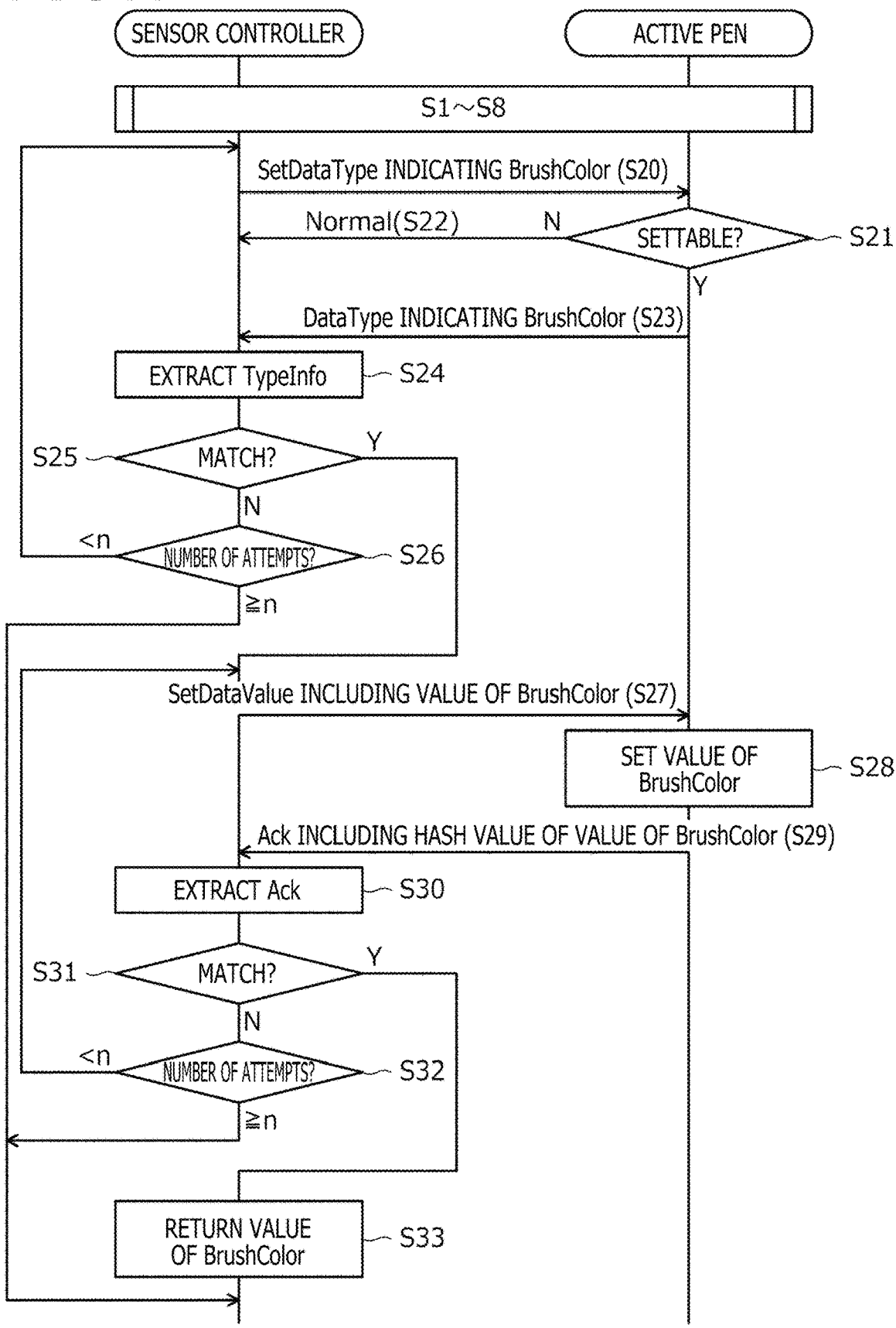
FIG. 7 is a sequence diagram illustrating processing performed when data is set to the active pen from the sensor controller according to the present disclosure.

FIG. 7 is a sequence diagram illustrating the processing performed when data is set to the active pen 2 from the sensor controller 31. Although the example described herein assumes a case where the value of the attribute BrushColor is set to the active pen 2, the processing to be described below similarly applies to a case where the other data is set.

First, the sensor controller 31 performs the processes of S1 to S8 illustrated in FIG. 6. Then, when the active pen 2 supports the attribute BrushColor, the sensor controller 31 performs the processing from S20 onward. As with the case illustrated in FIG. 6, the processes of S1 to S8 may be performed in advance.

In S20, the sensor controller 31 transmits the command SetDataType (first uplink signal) including the identifier SetDataType indicating the attribute BrushColor. The active pen 2 which has received this command SetDataType determines whether or not the attribute BrushColor can be set to itself (S21). When the attribute BrushColor cannot be set to itself, the active pen 2 transmits the data signal Normal (second downlink signal) (S22). When the attribute Brush-Color can be set to itself, the active pen 2 transmits the data signal DataType (first downlink signal) including the data TypeInfo indicating the attribute BrushColor (response data indicating that the attribute BrushColor can be set) (S23).

The sensor controller 31 considers the data signal received in the same frame as the command SetDataType transmitted at S20 as the data signal DataType and extracts the data TypeInfo (S24). Then, the sensor controller 31 determines whether or not the extracted data TypeInfo matches the transmitted identifier SetDataType (S25). If they match, the sensor controller 31 proceeds to S27. On the other hand, if they do not match, the sensor controller 31 determines whether or not the number of attempts has reached the predetermined n times (S26). When the sensor controller 31 determines that the number of attempts has not reached the predetermined n times, the sensor controller 31 returns to S20 and repeats the processing. When the sensor controller 31 determines that the number of attempts has reached the predetermined n times, the sensor controller 31 ends the processing without acquiring data.

Here, when the sensor controller 31 determines at S25 that the extracted data TypeInfo does not match the transmitted identifier SetDataType, it is preferable that the sensor controller 31 consider the data signal received in the same frame as the command SetDataType transmitted at S20 as the data signal Normal and extract the normal data. In this way, the sensor controller 31 can receive the entire pen-pressure value PRE transmitted from the active pen 2.

The sensor controller 31 which has proceeded to S27 transmits the command SetData Value (second uplink signal) including the value SetData Value indicating the value of the attribute BrushColor by using a frame (second frame) following the frame (first frame) in which the uplink signal US has been transmitted at S20. The active pen 2 which has received this command SetData Value sets the value of the received attribute BrushColor in its own memory (S28), and then generates and transmits the data signal Ack including the response Ack that is the hash value of the value of the received attribute BrushColor (S29).

The sensor controller 31 which has received the data signal Ack transmitted at S29 extracts the response Ack from the received data signal Ack (S30). Then, the sensor controller 31 determines whether or not the extracted response Ack matches the hash value of the transmitted value SetData Value (S31). If they match, the sensor controller 31 returns the value of the set attribute BrushColor to the main routine (S33) and ends the processing. On the other hand, if they do not match, the sensor controller 31 determines whether or not the number of attempts has reached the predetermined n times (S31). When the sensor controller 31 determines that the number of attempts has not reached the predetermined n times, the sensor controller 31 returns to S27 and repeats the processing. When the sensor controller 31 determines that the number of attempts has reached the predetermined n times, the sensor controller 31 ends the processing without setting data.

Figure 8:
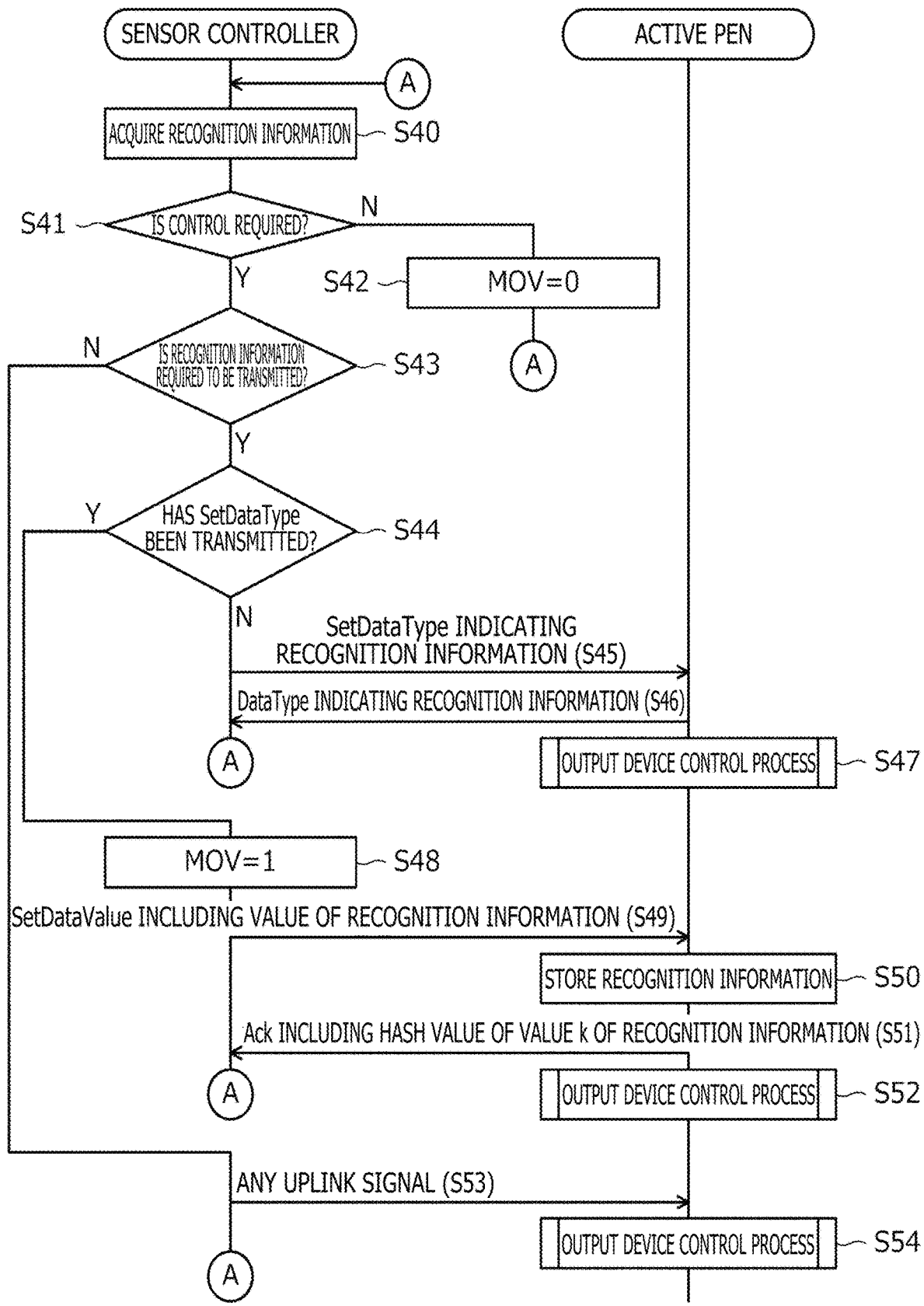
FIG. 8 is a sequence diagram illustrating processing for the sensor controller to control an output device of the active pen according to the present disclosure.

FIG. 8 is a sequence diagram illustrating the processing for the sensor controller 31 to control the output device 26 of the active pen 2. In the processing illustrated in FIG. 8, processing similar to the one illustrated in FIG. 7 is performed to set recognition information to the active pen 2. To avoid excessively complexing the drawing, the description of part of the processing is omitted in FIG. 8.

After starting the processing illustrated in FIG. 8, the sensor controller 31 first acquires the recognition information regarding the active pen 2 (S40). The recognition information is the information regarding the pen that can be recognized by the sensor controller 31, and the sensor controller 31 performs the process of S40 every time the sensor controller 31 receives the downlink signal DS, regardless of whether or not the output device 26 is to be controlled. Specifically, the recognition information may be, for example, the pen-pressure value of the active pen 2 indicated by the pen-pressure value or the shortened pen-pressure value received from the active pen 2, the position of the active pen 2, or the movement speed of the active pen 2 calculated from a change in the position of the active pen 2. If the sensor controller 31 can acquire the angle (e.g., tilt angle) of the active pen 2, the angle of the active pen 2 may be used as the recognition information.

Next, the sensor controller 31 determines whether or not the control of the output device 26 is required according to the recognition information acquired at S40 (S41). Specifically, when the recognition information (in this case, for example, the value of the header HD2 described above) indicates that the active pen 2 is in the contacting state, the sensor controller 31 may determine that the control of the output device 26 is required, and in other cases, the sensor controller 31 may determine that the control of the output device 26 is not required. Further, when a series of pieces of recognition information including recognition information acquired in the past indicate that the active pen 2 is moving on the touch surface 3a while maintaining the contacting state (that is, the active pen 2 is sliding on the touch surface 3a), the sensor controller 31 may determine that the control of the output device 26 is required, and in other cases, the sensor controller 31 may determine that the control of the output device 26 is not required.

When the sensor controller 31 determines at S41 that the control of the output device 26 is not required, the sensor controller 31 sets the control information MOV illustrated in FIG. 3 to 0 (S42). After that, the sensor controller 31 returns to S40. Since the control information MOV is set to 0 at S42, the control information MOV included in the uplink signal US to be transmitted thereafter is set to 0. On the other hand, when the sensor controller 31 determines at S41 that the control of the output device 26 is required, the sensor controller 31 determines whether or not the transmission of the recognition information is required (S43).

Details of S43 will be described below. In order to control the output device 26 by using the recognition information, it is necessary to supply the recognition information to the active pen 2. However, since the recognition information has a large data size, the sensor controller 31 cannot transmit the recognition information frequently. Therefore, the sensor controller 31 transmits the recognition information with low frequency, for example, every 10 frames. When the sensor controller 31 does not transmit the recognition information, the sensor controller 31 uses the control information MOV to only notify the active pen 2 of whether or not the control of the output device 26 is required. In this way, the control of the output device 26 can be enabled or disabled according to the latest recognition information without the need to transmit the recognition information every frame.

Referring back to FIG. 8, when the sensor controller 31 determines at S43 that the transmission of the recognition information is required, the sensor controller 31 sets the recognition information acquired at S40 to the active pen 2 by performing processing similar to the one illustrated in FIG. 7. Specifically, after the sensor controller 31 determines at S43 that the transmission of the recognition information is required, the sensor controller 31 determines whether or not the command SetDataType has been transmitted (S44). When the sensor controller 31 determines that the command SetDataType has not been transmitted, the sensor controller 31 transmits the command SetDataType including the identifier Set DataType indicating the recognition information (S45). The active pen 2 which has received this command SetData Type transmits the data signal DataType including the data TypeInfo indicating the received identifier SetData Type (S46) and performs an output device control process (S47).

Figure 9:
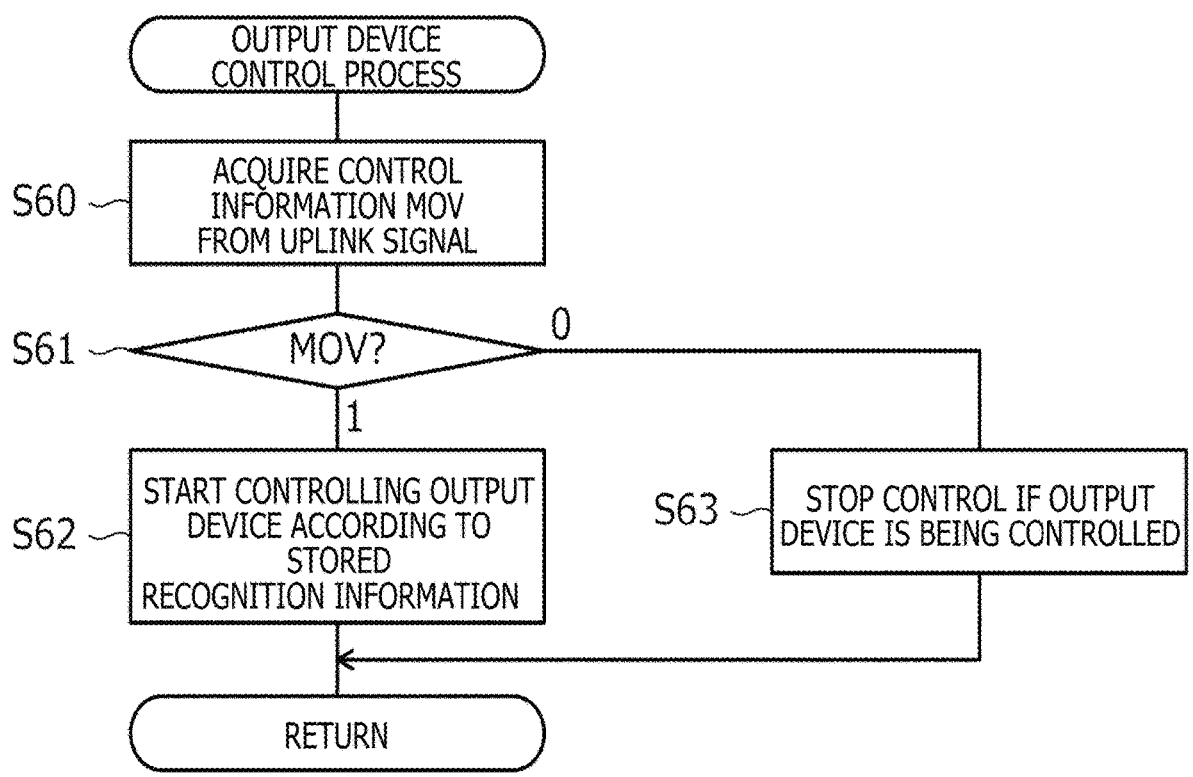
FIG. 9 is a diagram illustrating an output device control process performed by the active pen according to the present disclosure.

FIG. 9 is a diagram illustrating the output device control process performed by the active pen 2. As illustrated in the FIG. 9, the active pen 2 first acquires the control information MOV from the received latest uplink signal US (S60), and then determines whether the value of the control information MOV is 1 or 0 (S61). When the active pen 2 determines that the value of the control information MOV is 1, the active pen 2 starts controlling the output device 26 according to the recognition information stored at S50 to be described later (S62). Specifically, if the output device 26 is, for example, a haptic element, the active pen 2 starts vibration control. If the output device 26 is, for example, a light-emitting element, the active pen 2 starts light-emitting control. If the output device 26 is, for example, an acoustic element, the active pen 2 starts sound control. When the active pen 2 determines at S61 that the value of the control information MOV is 0, the active pen 2 stops the control if the output device 26 is being controlled (S63). Accordingly, during a period in which the sensor controller 31 sets the control information MOV to 1, the output device 26 continues to be controlled.

Referring back to FIG. 8, the sensor controller 31 which has received the data signal Data Type transmitted at S46 returns to S40 and continues the processing. When the sensor controller 31 determines at S44 that the command SetDataType has been transmitted, the sensor controller 31 sets the control information MOV to 1 (S48) and transmits the command SetData Value (second uplink signal) including the value SetData Value indicating the value of the recognition information (S49).

The active pen 2 which has received the command SetData Value transmitted at S49 extracts the recognition information from the received command SetData Value and stores the recognition information in the memory (S50). Then, the active pen 2 generates and transmits the downlink signal DS including the response Ack that is the hash value of the value of the stored recognition information (S51) and performs the output device control process described with reference to FIG. 9 again (S52). At this time, since the control information MOV is set to 1, the active pen 2 performs the process of S62 illustrated in FIG. 9 so that the output device 26 is being controlled.

When the sensor controller 31 determines at S43 that the transmission of the recognition information is not required, the sensor controller 31 transmits any uplink signal US (first uplink signal) that is required to be transmitted at that time (S53). The active pen 2 which has received this uplink signal US performs the output device control process described with reference to FIG. 9 again (S54).

When the transmission at S53 is performed in one or more frames (second frame(s)) that are after the frame (first frame) in which the command SetData Value has been transmitted at S49 and that are before the process of S42 is performed, the control information MOV included in the uplink signal US to be transmitted is set to 1. Therefore, at S54, the active pen 2 performs the process of S62 of FIG. 9, so that the output device 26 continues to be controlled.

As described above, in the communication method according to the present embodiment, the command SetDataType for notifying the active pen 2 of the type of data and the command SetData Value for actually transmitting the value of the data are transmitted in separate frames. This makes it possible to prevent an increase in a size of the uplink signal US. Therefore, the data can be set to the active pen 2 by using the command included in the uplink signal US while the periodicity of the normal data such as the pen-pressure value is maintained.

Further, in the communication method according to the present embodiment, even when it is difficult to place the pen-pressure value PRE in the downlink signal DS, the shortened pen-pressure value CPRE1 or CPRE2 can be placed instead. Therefore, the response data can be transmitted from the active pen 2 to the sensor controller 31 while the periodicity of the normal data such as the pen-pressure value is maintained.

Moreover, in the communication method according to the present embodiment, the output device 26 is controlled according to the uplink signal US including the control information MOV. Therefore, the output device 26 disposed in the active pen 2 can be controlled at an appropriate timing, that is, at a timing excluding a timing when the pen tip is pressed against a surface such as a wall other than the touch surface 3a.

Further, in the communication method according to the present embodiment, the control of the output device 26 can be enabled or disabled according to the latest recognition information without the need to transmit the recognition information every frame. Therefore, the output device 26 disposed in the active pen 2 can be properly controlled according to the recognition information.

Although the preferred embodiment of the present disclosure has been described above, the present disclosure is by no means limited to the above-described embodiment. As a matter of course, the present disclosure can be implemented in various modes without departing from the scope of the present disclosure.

For example, the host processor 33 may perform part of the processing that has been described as the processing performed by the sensor controller 31 in the embodiment described above.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A position detection system, comprising:
an active pen; and
a sensor controller that communicates with the active pen,
wherein, after the active pen has established pairing with the sensor controller, the active pen transmits a plurality of downlink signals during a fixed frame cycle in which an uplink signal is transmitted by the sensor controller,
wherein a transmission start timing of the downlink signals is based on a local identifier assigned using a communication protocol,
wherein the downlink signals include a first downlink signal and a second downlink signal,
wherein transmission of the first downlink signal starts after a first predetermined time interval has elapsed from a start of transmission of the uplink signal,
wherein transmission of the second downlink signal starts after a second predetermined time interval has elapsed from a start of transmission of the first downlink signal, and
wherein the sensor controller, in operation, detects a position of the active pen and receives data transmitted from the active pen during the fixed frame cycle in which the uplink signal is transmitted by the sensor controller.

2. The position detection system according to claim 1, wherein a length of time from a start of transmission of the second downlink signal to the start of transmission of a next downlink signal is equal to the second predetermined time interval.

3. The position detection system according to claim 1, wherein the active pen, in operation, starts communicating with the sensor controller by establishing the pairing with the sensor controller.

4. The position detection system according to claim 3, wherein, through the pairing, the active pen is assigned the local identifier by the sensor controller.

5. The position detection system according to claim 1, wherein:
the sensor controller, in operation, acquires a timing at which pixels in a display are driven from a host processor, and
the sensor controller, in operation, determines the fixed frame cycle according to a pixel driving cycle.

6. The position detection system according to claim 1, wherein the sensor controller, in operation, transmits a plurality of uplink signals during a plurality of fixed frame cycles.

7. The position detection system according to claim 6, wherein a time length of each of the uplink signals is a fixed value.

8. The position detection system according to claim 6, wherein:

the uplink signals include a first uplink signal and a second uplink signal;

the sensor controller, in operation, transmits the first uplink signal in a first frame, the first uplink signal including an identifier that indicates a type of data to be transmitted to the active pen in a second frame, the second frame following the first frame; and the sensor controller, in operation, transmits a second uplink signal in the second frame, the second uplink signal including a value of data of the type indicated by the identifier included in the first uplink signal.

9. The position detection system according to claim 8, wherein the first downlink signal or the second downlink signal includes a shortened pen-pressure value made up of a predetermined number of high-order bits of a pen-pressure value.

10. The position detection system according to claim 9, wherein the sensor controller, in operation, reports to a host processor the pen-pressure value restored from the shortened pen-pressure value included in the first downlink signal or the second downlink signal.

11. A method in a position detection system, the method comprising:

after an active pen has established pairing with a sensor controller, transmitting, by the active pen, a plurality of downlink signals during a fixed frame cycle in which an uplink signal is transmitted by the sensor controller, wherein a transmission start timing of the downlink signals is based on a local identifier assigned using a communication protocol, wherein the downlink signals include a first downlink signal and a second downlink signal, wherein transmission of the first downlink signal starts after a first predetermined time interval has elapsed from a start of transmission of the uplink signal, wherein transmission of the second downlink signal starts after a second predetermined time interval has elapsed from a start of transmission of the first downlink signal;

detecting, by the sensor controller, a position of the active pen during the fixed frame cycle in which the uplink signal is transmitted by the sensor controller; and receiving, by the sensor controller, data transmitted from the active pen during the fixed frame cycle in which the uplink signal is transmitted by the sensor controller.

12. The method according to claim 11, wherein a length of time from a start of transmission of the second downlink signal to the start of transmission of a next downlink signal is equal to the second predetermined time interval.

13. The method according to claim 11, further comprising:

starting communications, by the active pen, with the sensor controller by establishing the pairing with the sensor controller.

14. The method according to claim 13, wherein, through the pairing, the active pen is assigned the local identifier by the sensor controller.

15. The method according to claim 11, further comprising:

acquiring, by the sensor controller, a timing at which pixels in a display are driven from a host processor, and determining, by the sensor controller, the fixed frame cycle according to a pixel driving cycle.

16. The method according to claim 11, further comprising:

transmitting, by the sensor controller, a plurality of uplink signals during a plurality of fixed frame cycles.

17. The method according to claim 16, wherein a time length of each of the uplink signals is a fixed value.

18. The method according to claim 16, wherein:

the uplink signals include a first uplink signal and a second uplink signal;

the method further comprises:

transmitting, by the sensor controller, the first uplink signal in a first frame, the first uplink signal including an identifier that indicates a type of data to be transmitted to the active pen in a second frame, the second frame following the first frame; and transmitting, by the sensor controller, a second uplink signal in the second frame, the second uplink signal including a value of data of the type indicated by the identifier included in the first uplink signal.

19. The method according to claim 18, wherein the first downlink signal or the second downlink signal includes a shortened pen-pressure value made up of a predetermined number of high-order bits of a pen-pressure value.

20. The method according to claim 19, further comprising:

reporting, by the sensor controller, to a host processor the pen-pressure value restored from the shortened pen-pressure value included in the first downlink signal or the second downlink signal.

* * * * *